United States Patent
Takumah (10) Patent No.: US 10,625,224 B2
(45) Date of Patent: Apr. 21, 2020

(54) MAGNET-ACTUATED MIXING DEVICE, SYSTEM AND METHOD OF USE

(71) Applicant: Maluki Takumah, Atlanta, GA (US)

(72) Inventor: Maluki Takumah, Atlanta, GA (US)

( * ) Notice: Subject to any disclaimer, the term of this patent is extended or adjusted under 35 U.S.C. 154(b) by 97 days.

(21) Appl. No.: 15/933,808

(22) Filed: Mar. 23, 2018

(65) Prior Publication Data
US 2019/0091638 A1  Mar. 28, 2019

Related U.S. Application Data (60) Provisional application No. 62/557,769, filed on Sep. 13, 2017.

(51) Int. Cl.
| | | |
|---|---|---|
| *B01F 7/00* | (2006.01) | |
| *A01K 63/04* | (2006.01) | |
| *B01F 15/00* | (2006.01) | |
| *B01F 13/00* | (2006.01) | |
| *B01F 13/08* | (2006.01) | |

(52) U.S. Cl.
CPC .......... *B01F 7/0025* (2013.01); *A01K 63/042* (2013.01); *B01F 7/00033* (2013.01); *B01F 7/0095* (2013.01); *B01F 7/00733* (2013.01); *B01F 13/002* (2013.01); *B01F 13/0818* (2013.01); *B01F 15/00506* (2013.01); *B01F 15/00694* (2013.01); *B01F 2215/0006* (2013.01); *B01F 2215/0037* (2013.01); *B01F 2215/0052* (2013.01); *B01F 2215/0068* (2013.01); *B01F 2215/0072* (2013.01)

(58) Field of Classification Search
CPC ................ B01F 7/0025; B01F 7/00033; B01F 7/00733; B01F 7/0095; B01F 13/08; B01F 13/0818; B01F 15/00694; B01F 2215/0006; B01F 2215/0037; B01F 2215/0052; B01F 2215/0068; B01F 2215/0072
USPC .................................................. 366/279, 273
See application file for complete search history.

(56) References Cited

U.S. PATENT DOCUMENTS

| | | | | |
|---|---|---|---|---|
| 2,702,571 | A * | 2/1955 | Murray | A47J 43/0465 241/294 |
| 2008/0186800 | A1* | 8/2008 | Jaffer | A47G 21/004 366/129 |
| 2010/0046323 | A1* | 2/2010 | Tien | B01F 13/0818 366/274 |
| 2015/0165396 | A1* | 6/2015 | Mattson | B01F 7/00058 366/279 |
| 2015/0223640 | A1* | 8/2015 | Choy | A47J 43/044 366/286 |
| 2017/0027187 | A1* | 2/2017 | Monteith | A23G 9/224 |

* cited by examiner

*Primary Examiner* — Marc C Howell
(74) *Attorney, Agent, or Firm* — Silver Legal LLC; Jarrett Silver (57) ABSTRACT

A mixing device, system and method of use for mixing liquids in a container using a separate magnet in a wearable. The mixing device receives a magnet insert that is magnetically coupled with the separate magnet. The separate magnet is placed in a wearable and can be actuated by a finger or a hand, and the actuation causes the mixing device to move and rotate. An insertable stem on the mixing device can have different shapes or functional attachments for enhancing function of the mixing device in different embodiments. In some embodiments, the magnet insert can be stored together with the wearable.

22 Claims, 13 Drawing Sheets

MAGNET-ACTUATED MIXING DEVICE, SYSTEM AND METHOD OF USE

CROSS REFERENCE TO RELATED APPLICATIONS

This application claims the benefit of U.S. Provisional Patent Application Ser. No. 62/557,769, filed Sep. 13, 2017.

TECHNICAL FIELD

The present specification relates to a magnet-actuated mixing device for use in liquids and as beverage and fish-tank accessories and methods of use.

BACKGROUND OF THE INVENTION

Many beverages primarily consist of a single liquid phase, such as wine, beer, milk, etc. while other beverages may contain more than one liquid phase, such as mixed drinks, coffee with cream and sugar, etc. Many beverages benefit for various reasons from being mixed (i.e., stirred) at least occasionally. This objective to mix is most evident after a multi-phase beverage is placed or poured into a container, such as a glass or cup, to prevent or at least minimize the separation of the beverage into component phases (or layers).

While various accessories for beverages and aquatic life containers (e.g., a fish tank) are currently available, such as straws, stirrers and swizzle sticks for beverages and skimmers, filters and filtration air pumps, for aquariums, there continues to be a need for new and better accessories.

SUMMARY OF THE INVENTION

Applicant introduces herein a novel mixing device for mixing liquids. Applicant's mixing device is part of a system driven by a magnet in a wearable accessory that together can be used with containers of consumable beverages and viable research motility in aquatic life. Additionally or alternatively, the mixing device can draw attention to or add educational interest of beverage and motility in aquatic life.

The mixing device can also be used in aquatic environments for research studies of fish by stimulating motility in fish through attraction to the mixing device or attachments to its stem or feeding the fish.

Another benefit is to use the mixing device to enhance oxygen solubility in liquids for aquatic life or beverages.

Another benefit of using the mixing device is to prevent or at least minimize separation of the beverage into component phases or layers.

Another benefit is to provide a novel process for stirring (i.e., mixing) of consumable beverages and conducting aquatic life motility studies using the mixing device.

These and other objects, features and advantages of this invention will become apparent from the following detailed description.

In this application, mixing will refer to the mixing (i.e., stirring) and pre-mixing of a mixing device comprising a housing containing a magnetic insert connected to mixing arms that is magnetically coupled to a magnet propelled by movement with finger or hand that actuates the mixing device causing it to rotate.

BRIEF DESCRIPTION OF THE DRAWINGS

In the drawings, like numbers represent like elements.

DETAILED DESCRIPTION OF THE INVENTION

Figure 1:
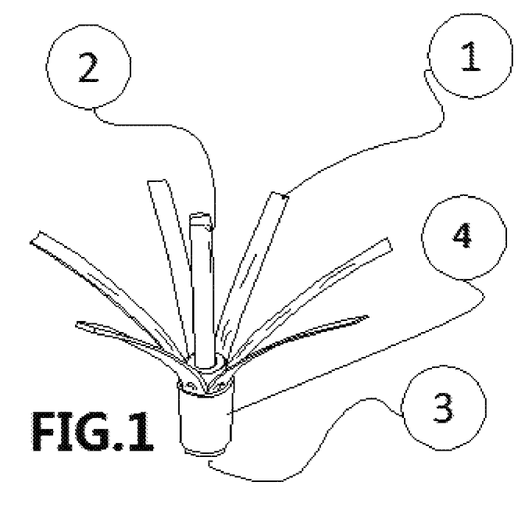
FIG. 1 is a perspective view of exemplary embodiment of a mixing device.

This specification is directed to mixing devices that are magnetically actuated by an external magnet. The external magnet may be in a wearable or accessory including a ring, necklace, watch, bracelet or cell phone/phone case. This mixing device may have various functional stem designs as discussed below. These can be used, among other places, with various types of containers of consumable beverages and research interacting with aquatic life. FIG. 1 shows a first exemplary embodiment of a mixing device, including mixing arms 1 shown in a flared or dilated propeller position with a magnetic insert 3, cylinder housing 4 for holding the magnetic insert 23 and the stem 2. Stem 2 can be a stem stick or a stem pick or have other shapes or functions such as the ones shown herein. Mixing arms 1 may include, among other things, spikes (shown in FIGS. 1, 3, 4, 6A-6E, 7 and 8) or blades (shown in FIGS. 2C and 5A-5C).

Figure 2A:
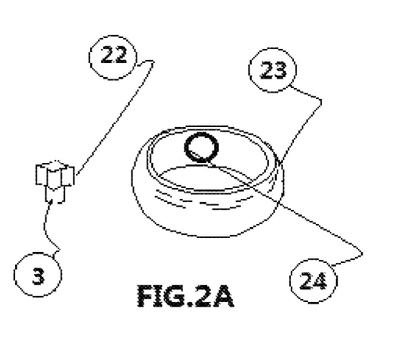
FIGS. 2A-2C are perspective and closeup views of wearable accessory ring that can hold a magnetic insert, which can also be used in a second exemplary embodiment of a mixing device.
Figure 2B:
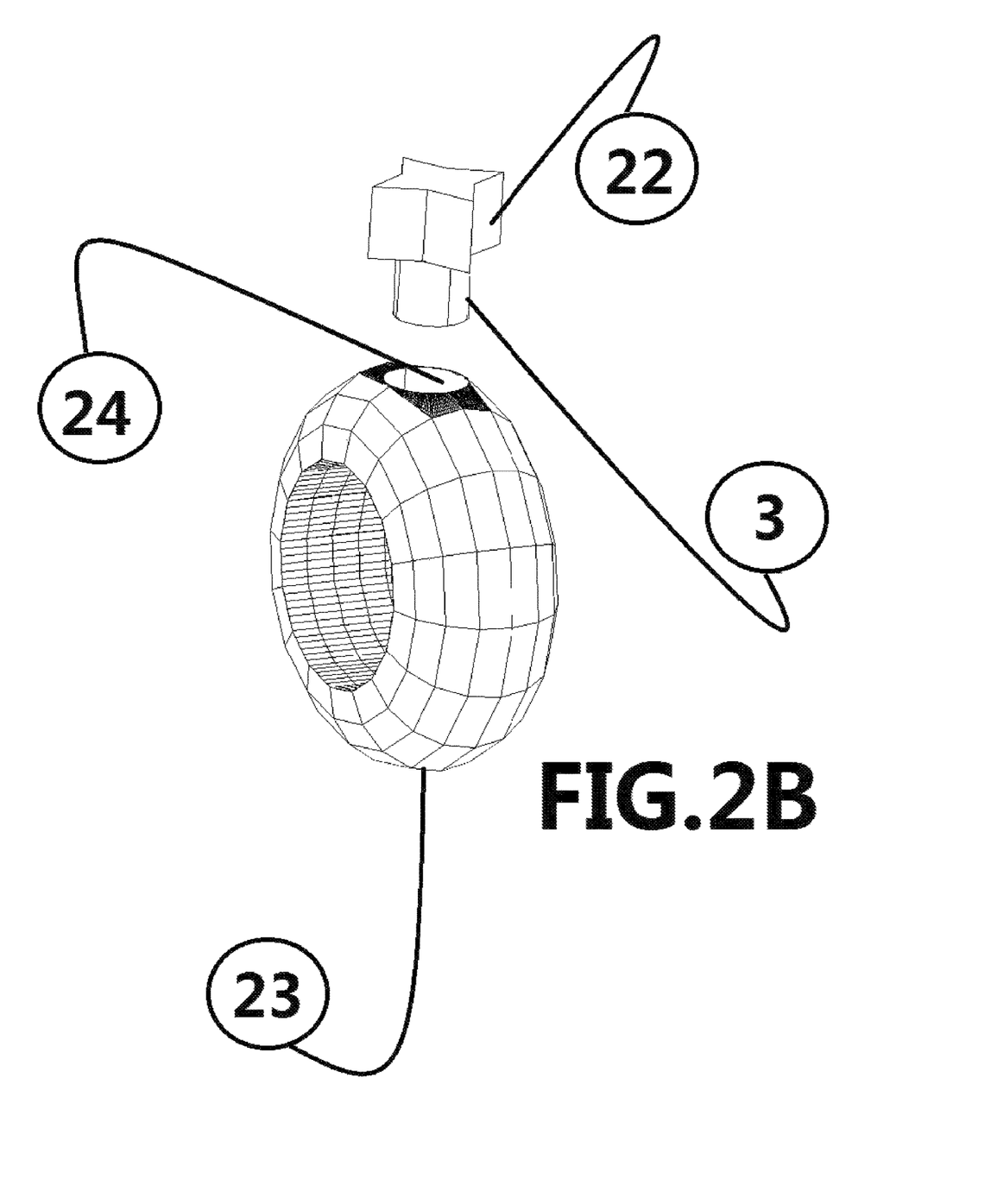
Figure 2C:
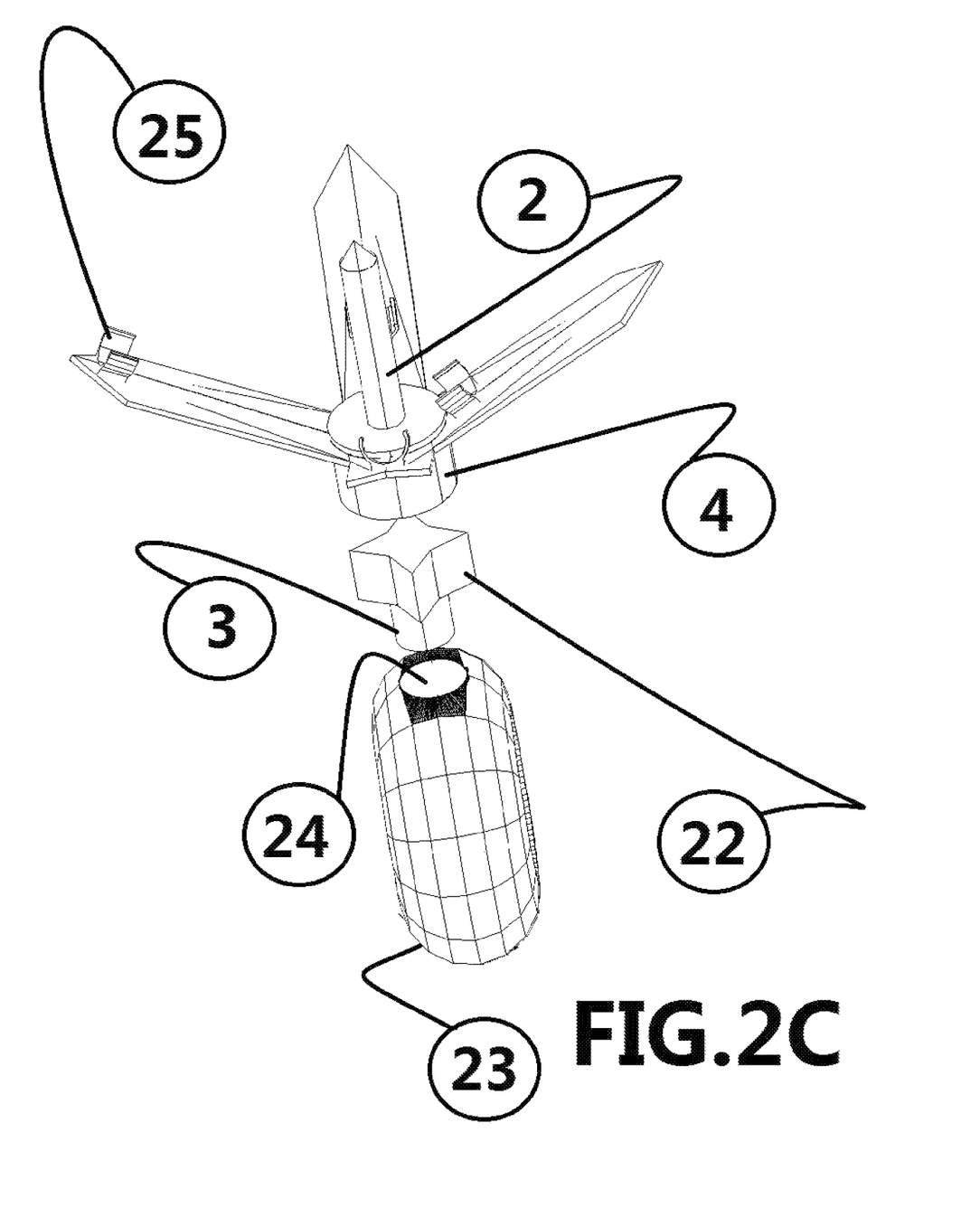

FIGS. 2A-2C shows exemplary embodiment of a magnetic ring 23 having a removeable magnetic insert 22 insertable into magnetic insert holding area 24, a cavity. In some embodiments the magnet insert may be permanently fixed into the mixing device. FIG. 2A shows a perspective view of magnetic ring 23 with the magnetic insert 22 outside of the ring. FIG. 2B shows a close-up view of the magnetic insert 22 about to be inserted in the magnetic insert holding area 24. Magnetic insert 22 is also shown as reference numeral 3 because the magnetic insert can be stored in the magnetic ring 23 or it can be stored in the mixing device's cylindrical housing 4. FIG. 2C illustrates this dual nature of the magnetic insert 3, 22 that can go into the mixing device or into the magnetic ring 23. FIG. 2C also shows clip 25, which will be discussed below with FIGS. 5B and 5C.

Figure 3:
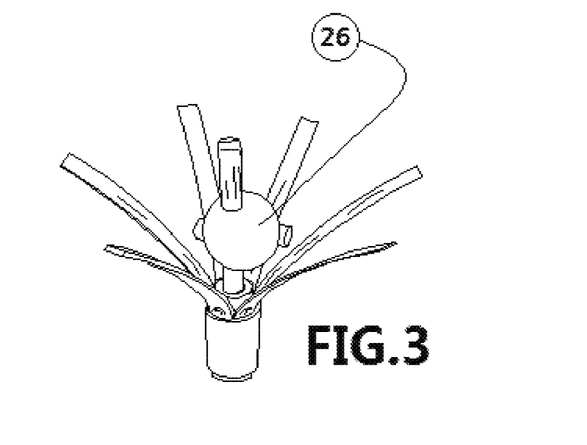
FIG. 3 is a perspective view of mixing device having a garnish on its stem.

FIG. 3 shows an enlarged view of the food stem stick or stem pick holding a garnish (olive) 26. The stem stick or stem pick 2 can hold items by poking or piercing through food garnishes, hors d'oeuvres and aquatic food thick paste. The magnet insert and the stem can be inserted in the interior cylinder or housing 4 to make it a whole finished one piece workable part. The device is still operable to rotate without the stem inserted.

Figure 4:
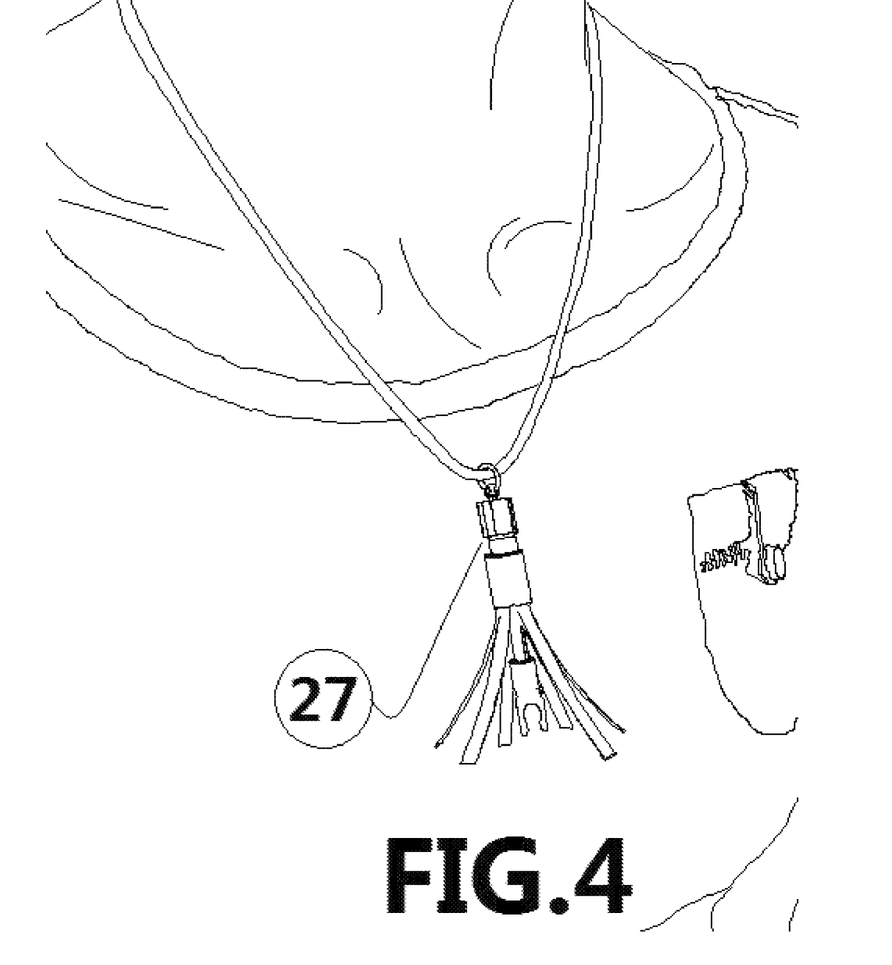
FIG. 4 is a perspective view of user wearing a necklace that magnetically attracts the various embodiments of mixing devices for storage when the mixing device is not in use. Here, the mixing device's stem has a gripper attachment.

FIG. 4 shows an enlarged view of the wearable magnet necklace 27 for conveniently storing and actuating the mixing device. As discussed later, the stem 2 in FIG. 4 holds a grabbing attachment.

Figure 5A:
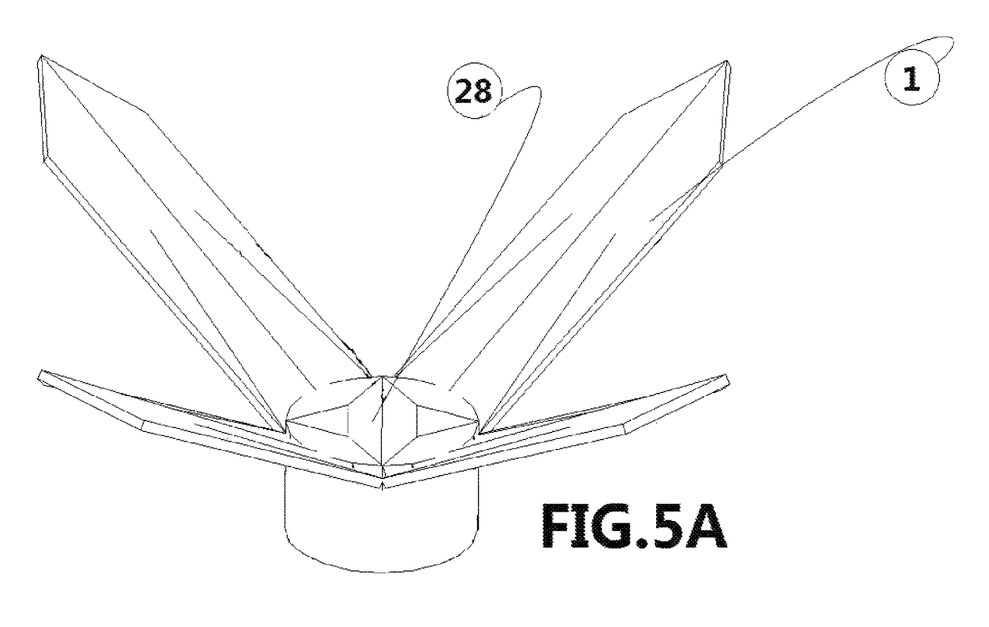
FIGS. 5A-5C are views of mixing arms on the mixing device in a dilated propeller and a condensed position and showing optional clips for holding the mixing arms in the closed position.
Figure 5B:
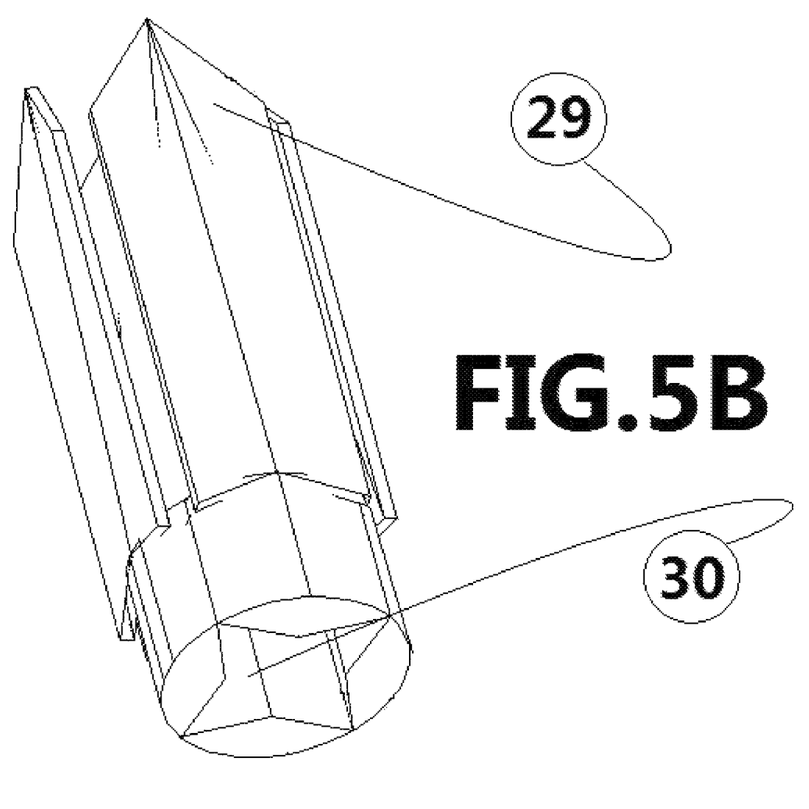
Figure 5C:
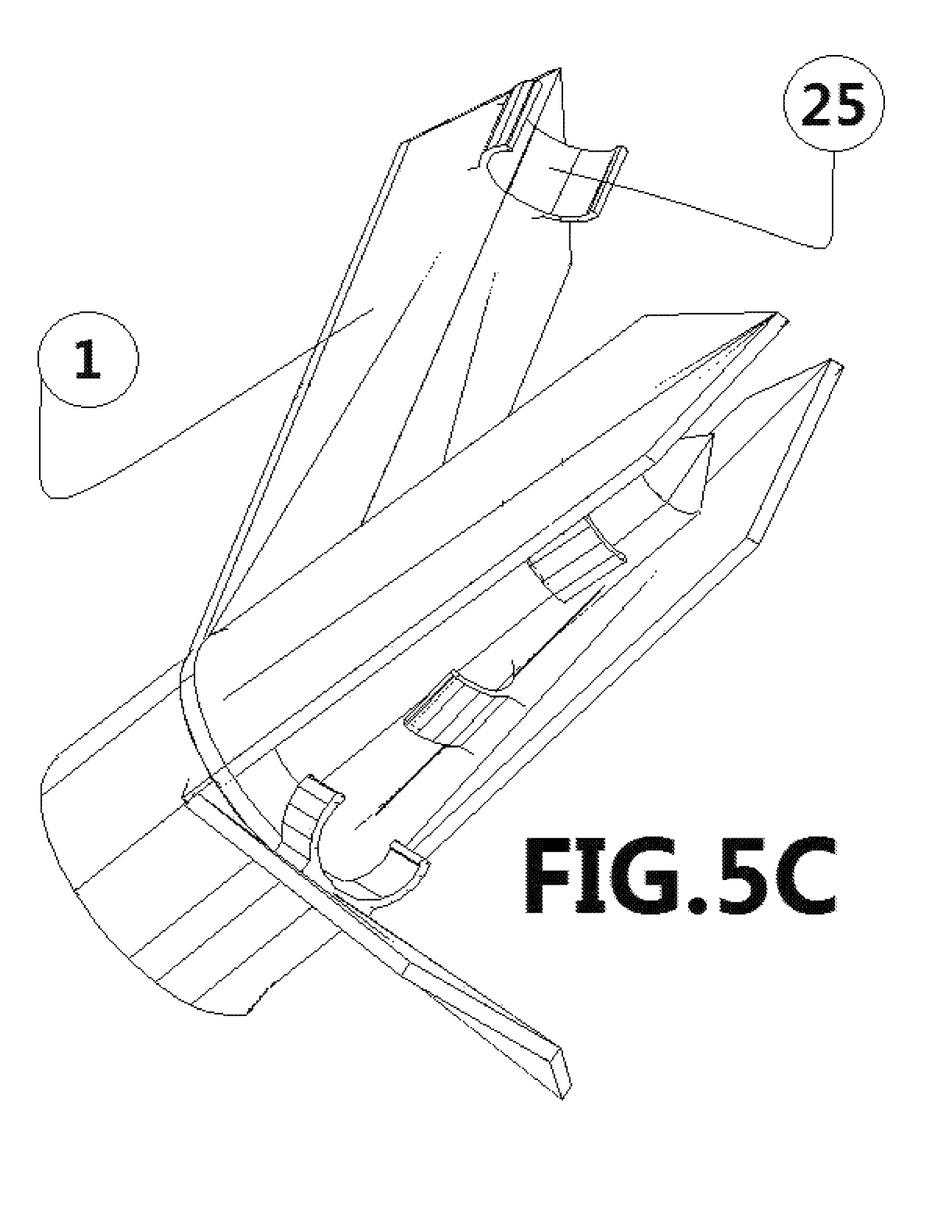

FIGS. 5A-5C shows embodiment of this invention an enlarged view of the accessory rotator coordinator connector with mixing arms (blades) 1. FIG. 5A depicts the blades in a dilated propeller position whereas FIG. 5B depicts the blades in a condensed position 29 for storage during non-use, FIGS. 2C and 5C illustrates clips 25 for conveniently attaching the blades to the stem 3 for device storage during non-use. The clips may be at different relative heights so as not to interfere with one another during clipping. Snap sockets (not shown) may also be used in addition or alternative to clip 25 to attach the mixing arms to the stem 2. Exemplary housing 4 is shown in more detail with a cavity or opened hollowed in area 28 for the cylinder base design. FIG. 5B also shows the backs 29 of the blades on the mixing device from the angle of the bottom 30 of the housing 4.

Figure 6A:
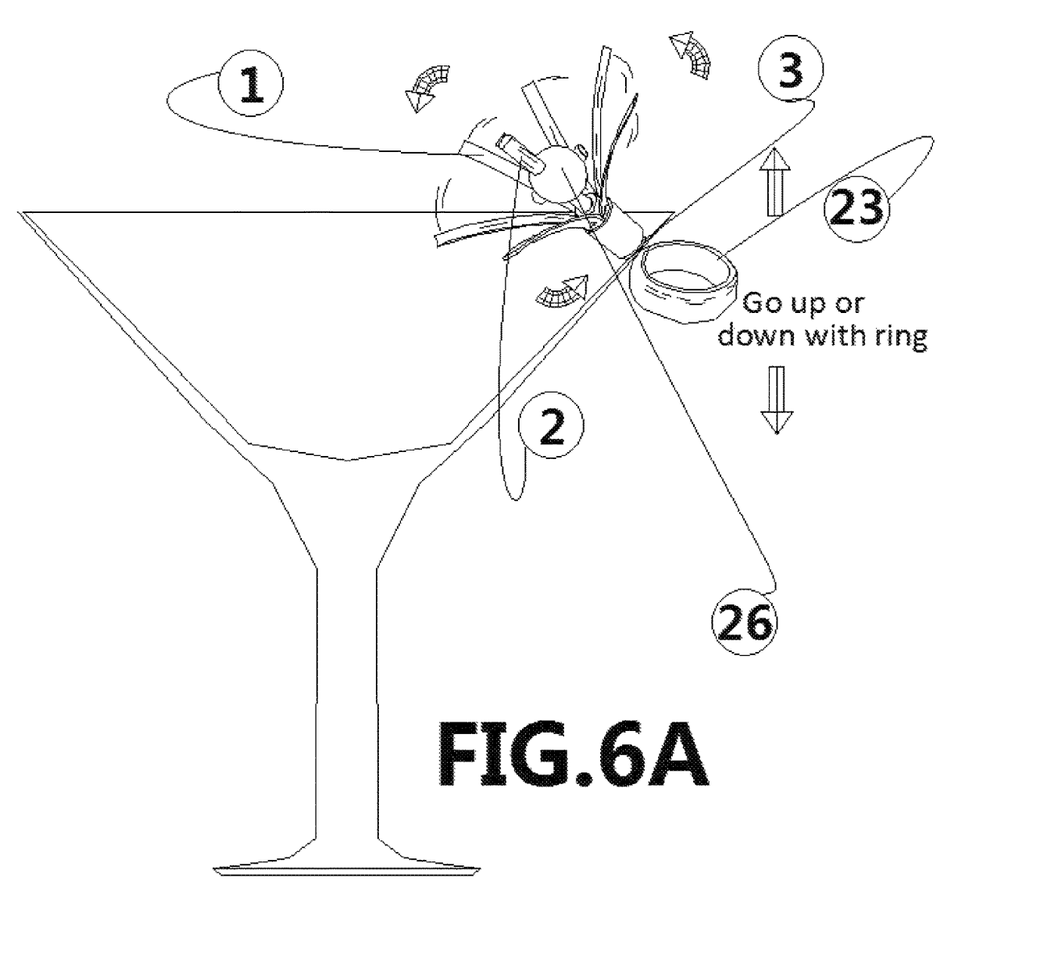
FIG. 6A is a cross sectional view of a martini glass to illustrate the user's actuation of the mixing device using a ring.
Figure 6B:
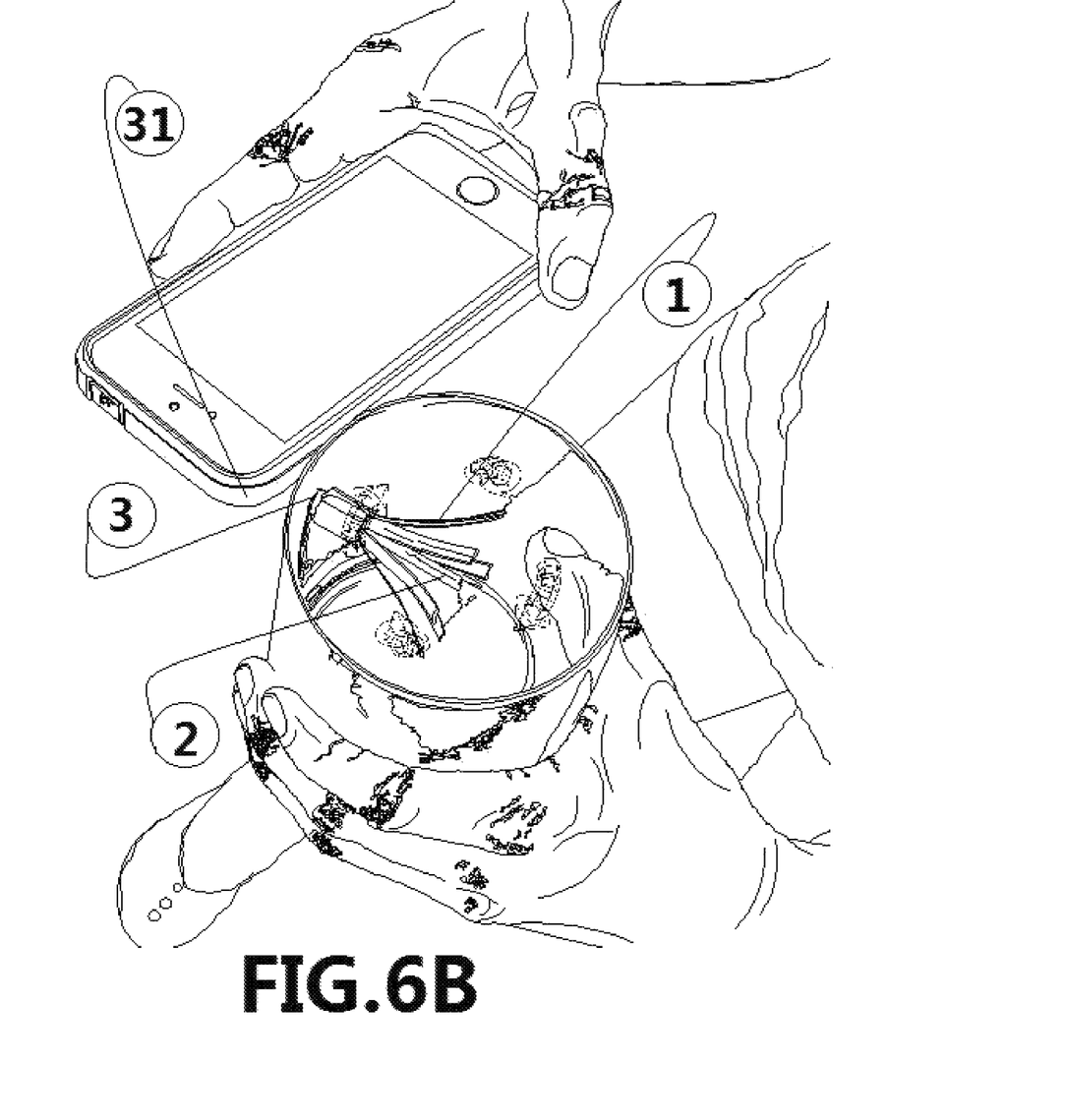
FIGS. 6B-6E are perspective views of mixing devices being actuated by different wearable accessories in beverage glasses.
Figure 6C:
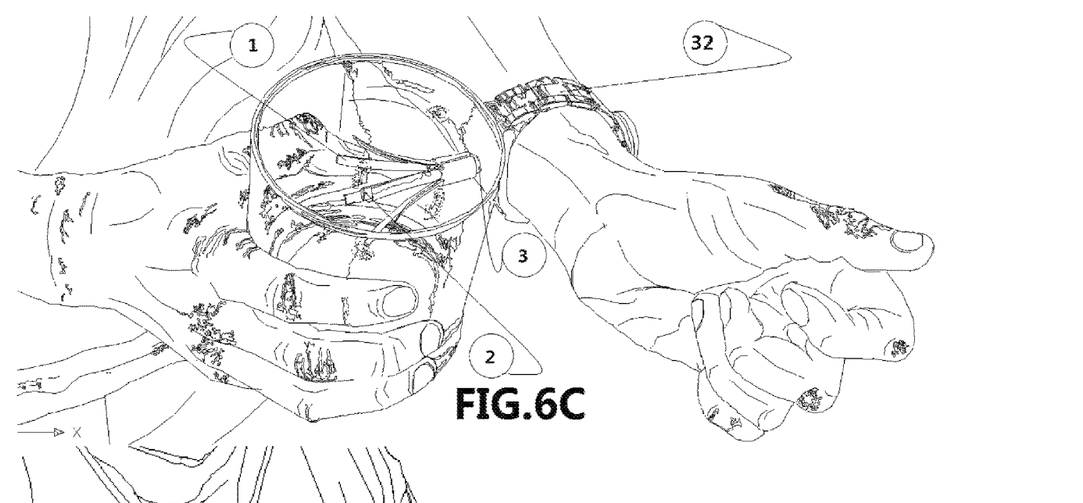
Figure 6D:
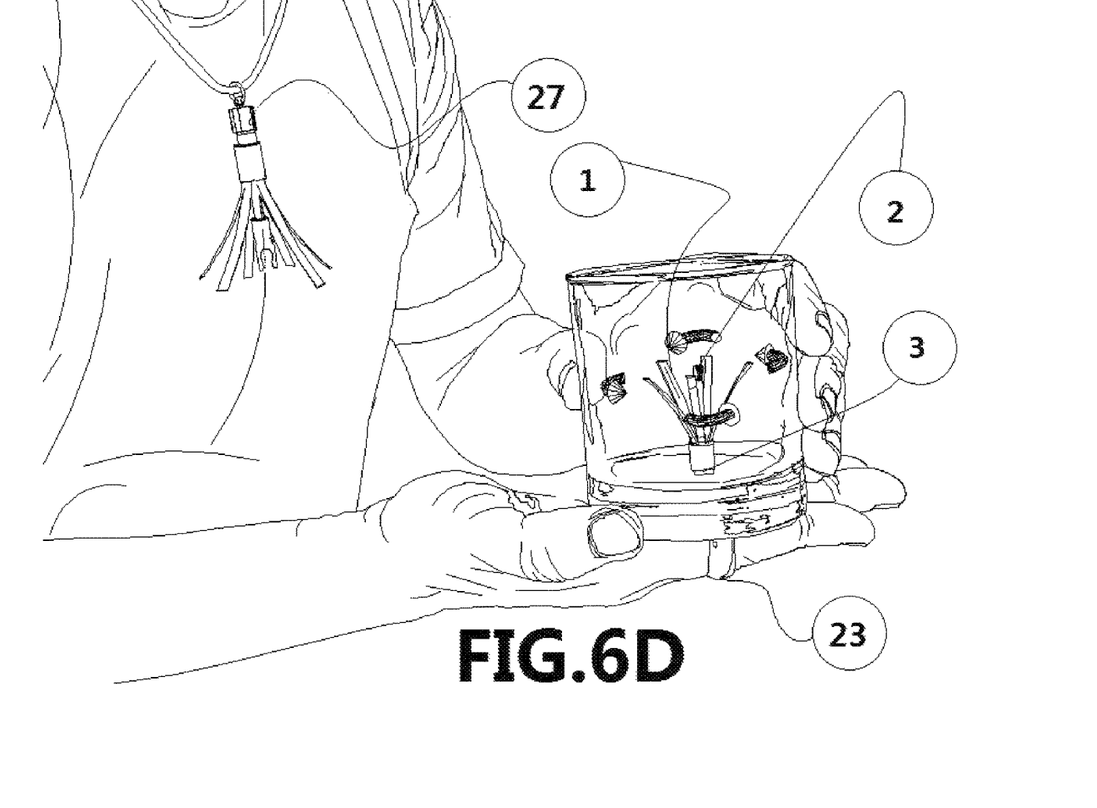
Figure 6E:
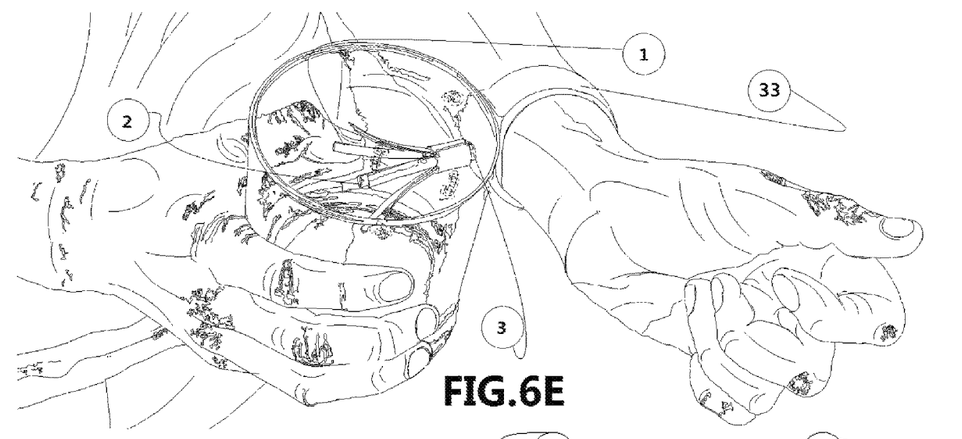
Figure 7:
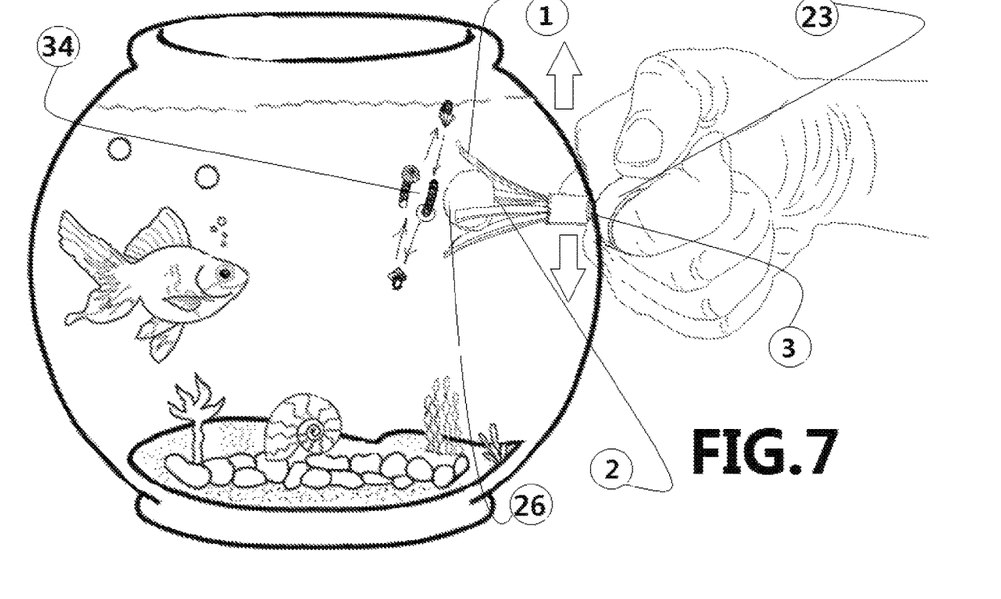
FIG. 7 is a perspective view of user using a ring to actuate a mixing device having a fish food attachment on its stem in an aquarium.

FIGS. 6A-6E and FIG. 7 show various embodiments of the wearables including magnets in use with the mixing device. FIGS. 6A, 6D and 7 depict the human or animal propulsion of magnetic ring 23 used to control the magnetic device in a martini glass, a beverage glass and an aquarium respectively. FIG. 6B shows the human or animal propulsion of a phone or phone case containing an embedded magnet used to the control the mixing device in a beverage glass. FIG. 6C shows the human or animal propulsion of a watch strap 32 containing an embedded magnet used to the control the mixing device in a beverage glass. FIG. 6E shows the human or animal propulsion of a bracelet 33 containing an embedded magnet used to the control the mixing device in a beverage glass.

Figure 8:
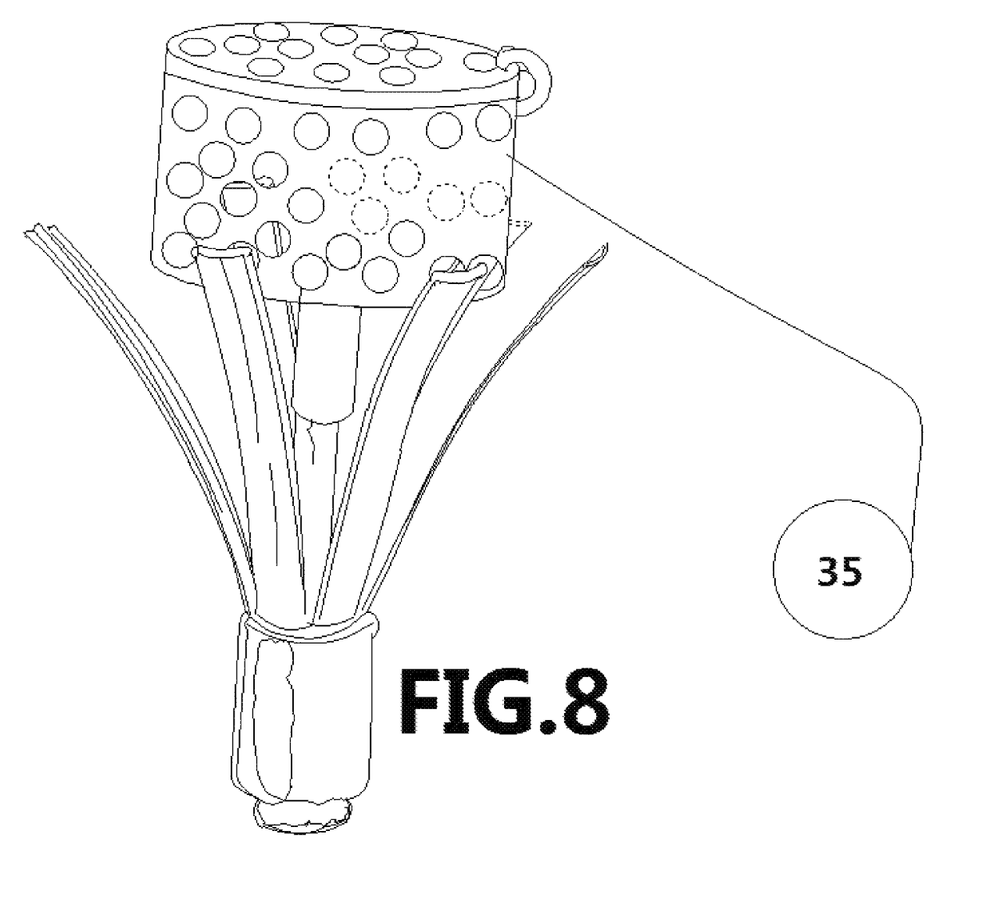
FIG. 8 is a closeup perspective view of a mixing device in a flared position with a porous container attached to its stem that acts as a tea infuser.

The stem 2 of the mixing device can be different shapes and optionally have different functional attachments. FIGS. 1 and 3 show the stem 2 as a stem stick with a blunt tip. FIGS. 2C and 5C show stem 2 as a stem pick with a sharp tip for piercing into food. FIGS. 4 and 6D show stem 2 having a gripper attachment. FIG. 6A depicts stem 2 holding a garnish (olive) 26 used to flavor in a martini. FIG. 7 depicts stem 2 holding aquatic fish food 34 to attach and encourage fish motility in an aquarium. FIG. 8 depicts stem 2 holding a porous container 35 used a tea infuser. Use of the mixing device in an aquarium can help oxygen or food dissolve into the water. Also, it can attract fish encouraging motility of fish and other marine life.

The invention claimed is:

1. A mixing system, the system comprising:
a mixing device comprising
a magnet insert,
a housing for holding the magnet insert, and
mixing arms circumferentially extending distally from the housing; and
a second magnet on a wearable accessory that is magnetically coupled with the magnet insert,
wherein moving of the wearable accessory that is separated from the mixing device through a substrate causes the mixing device to rotate.

2. The mixing system of claim 1, the mixing device further comprising a stem extending from the housing distally through the center of the mixing arms.

3. The mixing system of claim 2, wherein the stem includes a porous container attachment on the distal end.

4. The mixing system of claim 2, wherein the stem includes a spike configured to pierce through food or a pronged gripping attachment configured to hold food on the distal end.

5. The mixing system of claim 2, wherein at least one of the mixing arms includes a clip or snaps for connecting the at least one of the mixing arms to the stem.

6. The mixing system of claim 1, wherein at least part of the mixing device is edible and dissolves or disassociates in a liquid.

7. The mixing system of claim 1, wherein the magnet insert is removeable from the mixing device and attaches to the wearable accessory.

8. The mixing system of claim 1, wherein the wearable accessory is a magnetic ring wearable on a finger.

9. The mixing system of claim 1, wherein the magnet insert is removeable from the mixing device and the mixing device is made of disposable or reusable materials.

10. The mixing system of claim 1, wherein the wearable accessory is a ring, and the magnet insert fits into a magnet insert holding area in the ring when the magnet insert is not used in the mixing device.

11. The mixing system of claim 1, wherein the mixing arms have an open propeller position for mixing and a closed position for compact storage during non-use.

12. The mixing system of claim 11, wherein the mixing arms have clips or snaps configured to secure the mixing arms to a stem in the closed position the stem extending from the housing distally through the center of the mixing arms.

13. The mixing system of claim 1, wherein the wearable accessory is a necklace in which the second magnet is embedded in or to which the second magnet is attached, and the magnet insert can be coupled to the second magnet in the necklace when the mixing device is not in use.

14. The mixing system of claim 1, wherein the magnetic insert has a cross section matching a cross section of an interior cavity in the housing configured to secure the magnetic insert in place in the housing during mixing.

15. The mixing system of claim 1, wherein the wearable accessory is a ring, a necklace, a phone, a phone case, a bracelet or a watch.

16. A method of mixing a liquid in a container using the mixing device of claim 1, the method comprising the steps of:
placing the mixing device in the container with the liquid;
placing the second magnet near the mixing device on an opposite side of a wall of the container to establish magnetic coupling with the magnet insert of the mixing device; and
propelling the second magnet by finger or hand to actuate the mixing device and cause the mixing device to rotate and stir the liquid.

17. The method of claim 16, the method further comprising the steps of removing the magnet insert from the wearable accessory and placing the magnet insert in the mixing device before placing the mixing device in the container.

18. The method of claim 16, the method further comprising the step of removing the magnet insert from the mixing device and disposing of the mixing device.

19. The method of claim 16, the method further comprising the additional step of using the mixing device in an aquarium or the additional step of adding aquatic food paste to a stem attached to the housing of the mixing device.

20. A mixing device for mixing liquid in a container, the device comprising, a housing with an internal cavity with a first end configured for receiving a removeable magnet insert useable for actuating the mixing device and a second end configured for receiving a removeable stem insert extending from the housing distally along a stem axis; and mixing arms circumferentially extending distally from the housing around the stem axis, wherein the housing and the mixing arms and made of edible material or material dissolvable in the liquid, and the removeable magnet insert is configured to magnetically couple with a second magnet in a wearable accessory and such coupling across a substrate causes the mixing device with the removeable magnet insert to rotate upon movement of the second magnet.

21. A mixing device for mixing liquids in a container, the device comprising, a housing with an internal cavity with a first end configured for receiving a magnet insert useable for actuating the mixing device and a second end configured for receiving a stem insert extending from the housing distally along a stem axis; and mixing arms circumferentially extending distally from the housing around the stem axis and capable of dilating into a propeller formation for mixing or condensing into a storage position closer to the stem axis, wherein the magnet insert is configured to magnetically couple with a second magnet in a wearable accessory and such coupling across a substrate causes the mixing device with the magnet insert to rotate upon movement of the second magnet.

22. The mixing device of claim 21, wherein the mixing arms have clips for attaching to the stem insert.

* * * * *